US011981537B2

(12) United States Patent
Lanz et al.

(10) Patent No.: US 11,981,537 B2
(45) Date of Patent: May 14, 2024

(54) SELF-CLIMBING ELEVATOR ARRANGEMENT FOR USE DURING THE CONSTRUCTION OF A BUILDING

(71) Applicant: Kone Corporation, Helsinki (FI)

(72) Inventors: Otto Lanz, Helsinki (FI); Matti Rasanen, Helsinki (FI); Markku Haapaniemi, Helsinki (FI); Jukka Turpeinen, Helsinki (FI); Anssi Venho, Helsinki (FI); Janne Laine, Helsinki (FI); Janne Mikkonen, Helsinki (FI); Aki Haikonen, Helsinki (FI); Jari Osterman, Helsinki (FI); Jori Hagg, Helsinki (FI); Jorma Mustalahti, Helsinki (FI); Petri Kere, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 17/692,549

(22) Filed: Mar. 11, 2022

(65) Prior Publication Data

US 2022/0194744 A1 Jun. 23, 2022

Related U.S. Application Data

(63) Continuation of application No. PCT/EP2020/080385, filed on Oct. 29, 2020.

(30) Foreign Application Priority Data

Oct. 31, 2019 (EP) .................................... 19206456

(51) Int. Cl.

| | |
|---|---|
| ***B66B 19/00*** | (2006.01) |
| ***B66B 9/00*** | (2006.01) |
| ***B66B 11/00*** | (2006.01) |

(52) U.S. Cl.
CPC ................ *B66B 19/00* (2013.01); *B66B 9/00* (2013.01); *B66B 11/0045* (2013.01)

(58) Field of Classification Search
CPC .. B66B 19/002; B66B 19/005; B66B 11/0045
See application file for complete search history.

(56) References Cited

U.S. PATENT DOCUMENTS 4,258,825 A 3/1981 Collins
7,635,049 B2 * 12/2009 Van Der Meijden ........................ B66B 19/002 187/401

(Continued)

FOREIGN PATENT DOCUMENTS

CN 1918064 A 2/2007
CN 102099277 A 6/2011

(Continued)

OTHER PUBLICATIONS

Chinese Office Action dated Feb. 24, 2023 issued in corresponding Chinese Appln. No. 202080073229.1.

(Continued)

*Primary Examiner* — Diem M Tran
(74) *Attorney, Agent, or Firm* — Harness, Dickey & Pierce, P.L.C.

(57) ABSTRACT

The arrangement comprises a self-climbing installation platform comprising two consecutive decks, a machine room deck suspended from the installation platform and an elevator car suspended from the machine room deck. Each deck, the machine room deck and the car are supported movably with guide means on guide rails and locked and unlocked with locking means to the guide rails and/or to guide rail fixing means. Lifting means powered by a power source move the two decks in relation to each other. The installation platform climbs stepwise along the guide rails by alternatingly locking and unlocking the lower deck and the upper (Continued)

Figure 1:
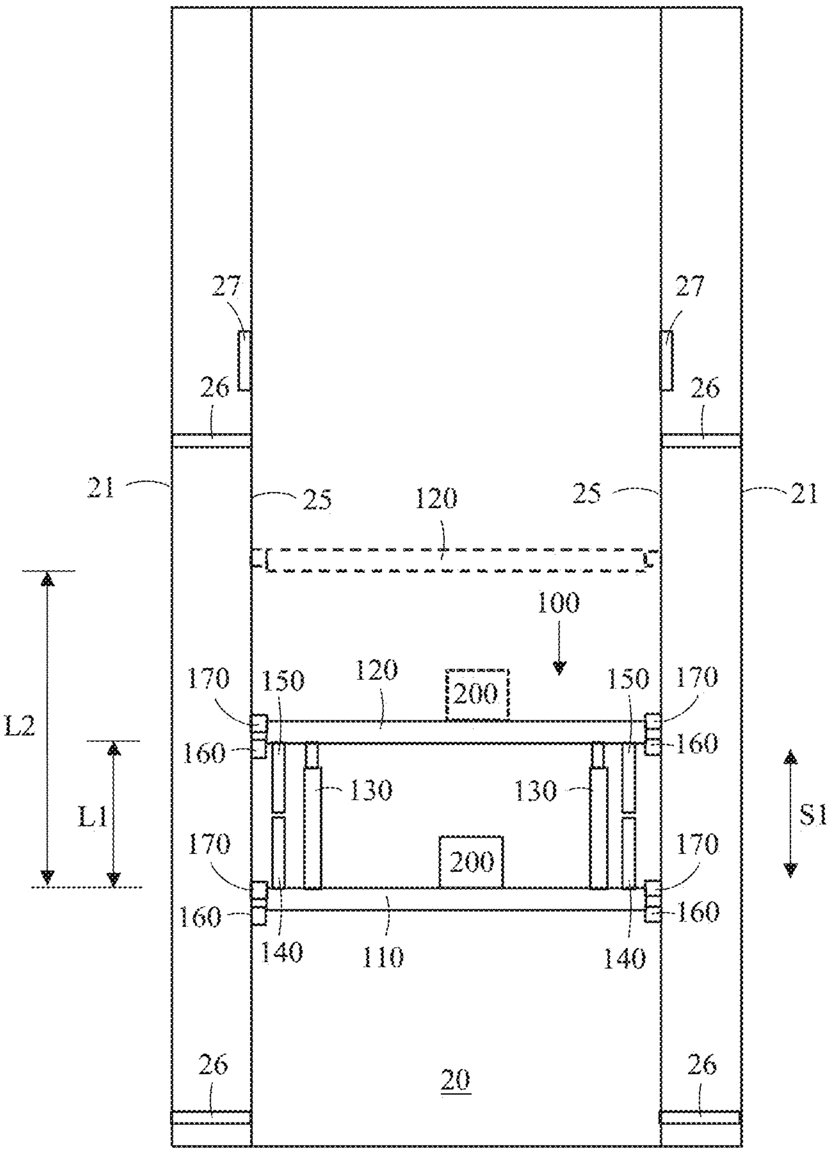

deck to the guide rails and/or to the guide rail fixing means and thereafter raising the unlocked deck.

20 Claims, 13 Drawing Sheets

(56) References Cited

U.S. PATENT DOCUMENTS

| | | | | |
|---|---|---|---|---|
| 9,783,391 | B2 | 10/2017 | Zerelles et al. | |
| 10,766,744 | B2 * | 9/2020 | Hägg | B66B 19/00 |
| 10,807,833 | B2 * | 10/2020 | Weibel | B66B 7/027 |
| 2004/0154870 | A1 | 8/2004 | Bass et al. | |
| 2007/0170014 | A1 | 7/2007 | Woronoff | |
| 2009/0223751 | A1 | 9/2009 | Peacock et al. | |
| 2012/0018252 | A1 | 1/2012 | Peacock et al. | |
| 2012/0291395 | A1 * | 11/2012 | Plathin | B66B 19/02 52/741.1 |
| 2014/0000987 | A1 * | 1/2014 | Peacock | B66B 9/187 187/414 |
| 2015/0107186 | A1 | 4/2015 | Wilts et al. | |
| 2015/0314993 | A1 | 11/2015 | Bolme et al. | |
| 2016/0152442 | A1 * | 6/2016 | Weber | B66B 19/005 187/359 |
| 2017/0327348 | A1 | 11/2017 | Bläsi | |
| 2019/0218065 | A1 | 7/2019 | Chaudhry et al. | |
| 2020/0062549 | A1 | 2/2020 | Kim | |
| 2021/0245997 | A1 * | 8/2021 | Rasanen | B66B 9/02 |
| 2021/0316959 | A1 | 10/2021 | Fridmann | |
| 2022/0332545 | A1 | 10/2022 | Weibel et al. | |

FOREIGN PATENT DOCUMENTS

| | | | | |
|---|---|---|---|---|
| CN | 102341336 | A | 2/2012 | |
| CN | 102666345 | A | 9/2012 | |
| CN | 103402901 | A | 11/2013 | |
| CN | 104379488 | A | 2/2015 | |
| CN | 109205445 | A | 1/2019 | |
| CN | 109436985 | A | 3/2019 | |
| DE | 102019205164 | A1 * | 10/2020 | |
| EP | 2275377 | A1 | 1/2011 | |
| FR | 2694279 | A1 | 2/1994 | |
| FR | 2782072 | A1 | 2/2000 | |
| JP | H03195694 | A | 8/1991 | |
| JP | 2013220859 | A | 10/2013 | |
| WO | WO-2010/010226 | A1 | 1/2010 | |
| WO | WO-2010/100319 | A1 | 9/2010 | |
| WO | WO-2011/148033 | A1 | 12/2011 | |
| WO | WO-2016096694 | A1 * | 6/2016 | B66B 11/0045 |

OTHER PUBLICATIONS

International Search Report and Written Opinion for International Application No. PCT/EP2020/080385 dated Feb. 11, 2021.

International Search Report and Written Opinion of International Application No. PCT/EP2020/080383 dated Jan. 29, 2021.

Chinese Office Action dated Feb. 17, 2023 issued in corresponding Chinese Appin. No. 202080073199.4.

Office Action dated Sep. 18, 2023 for corresponding U.S. Appl. No. 17/709,949.

* cited by examiner

SELF-CLIMBING ELEVATOR ARRANGEMENT FOR USE DURING THE CONSTRUCTION OF A BUILDING

CROSS-REFERENCE TO RELATED APPLICATION

This application is a continuation of PCT International Application No. PCT/EP2020/080385 which has an International filing date of Oct. 29, 2020, and which claims priority to European patent application number 19206456.6 filed Oct. 31, 2019, the entire contents of both of which are incorporated herein by reference.

FIELD

The invention relates to a self-climbing elevator arrangement for use during the construction of a building.

BACKGROUND

Elevators are needed in the construction stage of especially high-rise buildings to transport constructors and/or equipment to the floors in the building. Mechanics working on completed floors and constructors working on floors to be completed should be able to use the elevator.

A prior art jump-lift may be used in the construction stage of the building. The hoisting height of the elevator may be increased in steps of one or more floor levels each time the building has reached a predetermined height above the previous jump. The elevator machine room may be transported upwards in steps. The shaft must, however, be provided with special interfaces in this prior art arrangement. The elevator machine room is anchored to special anchoring points made beforehand to the walls of the shaft along the height of the shaft.

SUMMARY

An object of the present invention is to present a novel self-climbing elevator arrangement for use during the construction of a building.

The self-climbing elevator arrangement for use during the construction of a building is defined in claim 1.

Prior art jump-lift concepts used in high-rise buildings are complex and expensive. They also require much space above the machine room deck. The number of floors that cannot be serviced with the elevator car may thus be 4-5. Prior art jump-lift concepts further use intermediate platforms (crash decks) above the installation platform and below the deflection deck (provided by the building constructor) in order to prevent objects and material from falling in the shaft.

The novel arrangement will render some of the crash decks redundant. A crash deck is not needed between the two decks in the installation platform. The position of the deflection deck may be raised as the slip casting of the shaft proceeds.

The novel arrangement reduces the number of floors that cannot be serviced to a minimum by integrating some key functions. The self-climbing elevator arrangement requires only a limited space in the vertical direction in the shaft. The self-climbing elevator arrangement may thus be installed into the shaft at an early stage of the construction of the shaft and the building. The self-climbing elevator arrangement may also be used near the top of the already constructed shaft. An elevator supported on the self-climbing elevator arrangement may operate to a height of two landings below the top of the already constructed shaft.

The self-climbing elevator arrangement may be prefabricated and assembled into a transportable module at factory premises. The produced module may then be transported to the construction site with conventional transport methods. The module may be lifted into the pit in an early stage of the construction of the shaft and the building. The use of the module may be started when the shaft has reached a height in which the elevator is needed.

There is no need for special interfaces in the walls of the shaft when the self-climbing elevator arrangement according to the invention is used. The self-climbing elevator arrangement may climb on the guide rails already installed. The self-climbing elevator arrangement may also be locked in place in the shaft only through the guide rails and/or through fish plates associated with the guide rails in the shaft. There is no need for pockets in the shaft for the climbing and/or suspension process. The invention may be used in connection with any floor to floor distance in the building.

The self-climbing elevator arrangement is re-usable. The self-climbing elevator arrangement may be removed and transported to another construction site when the self-climbing elevator arrangement is not any more needed on the first site.

The machine room deck may be used as a temporary storage for guide rail magazines. The guide rail magazines may be lifted with the elevator car in the shaft. The guide rail magazines may be lifted from the car through a hatch in the machine room deck to the machine room deck. The guide rail magazines may then be temporary stored on the machine room deck before they are lifted to the installation platform in order to be installed to the walls of the shaft.

DRAWINGS

Figure 2:
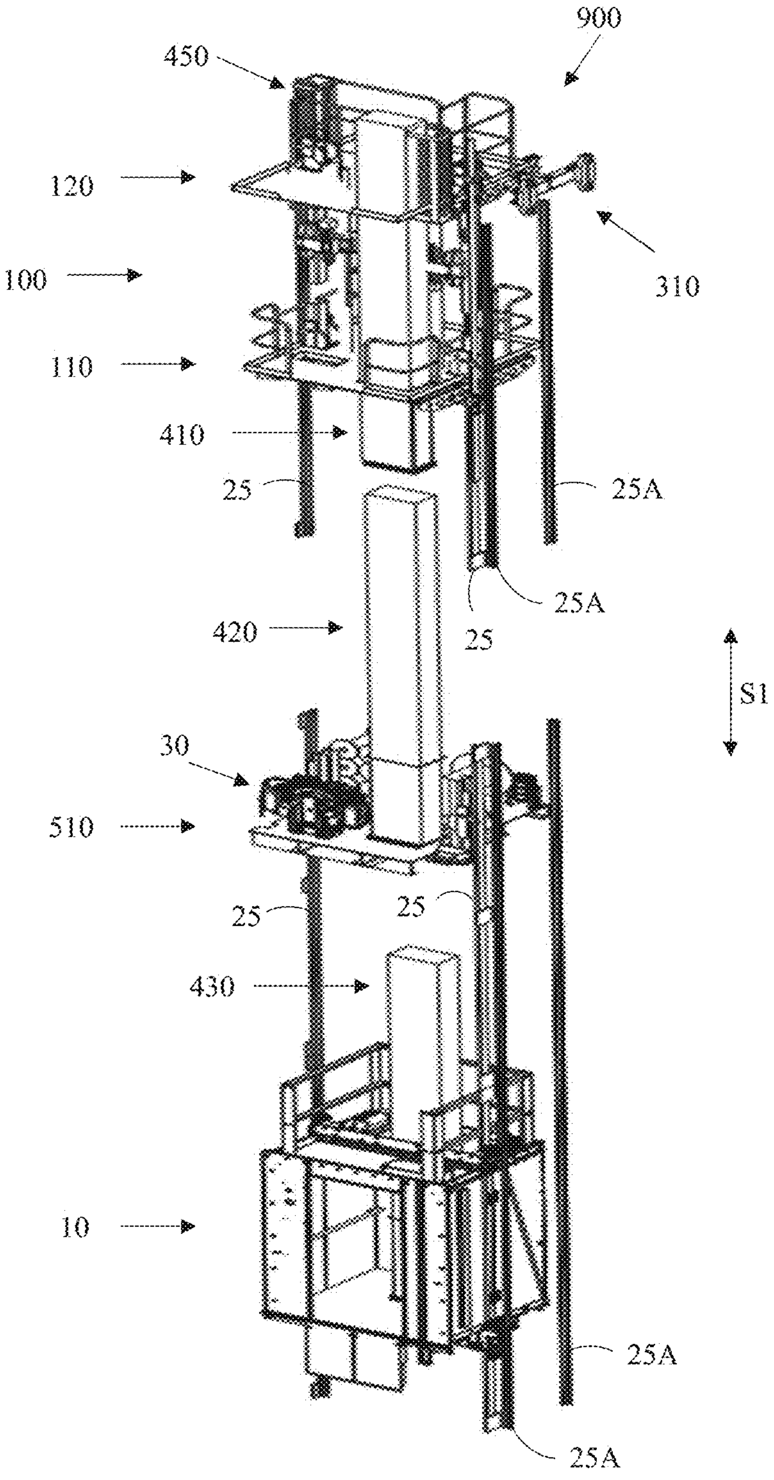
Figure 3:
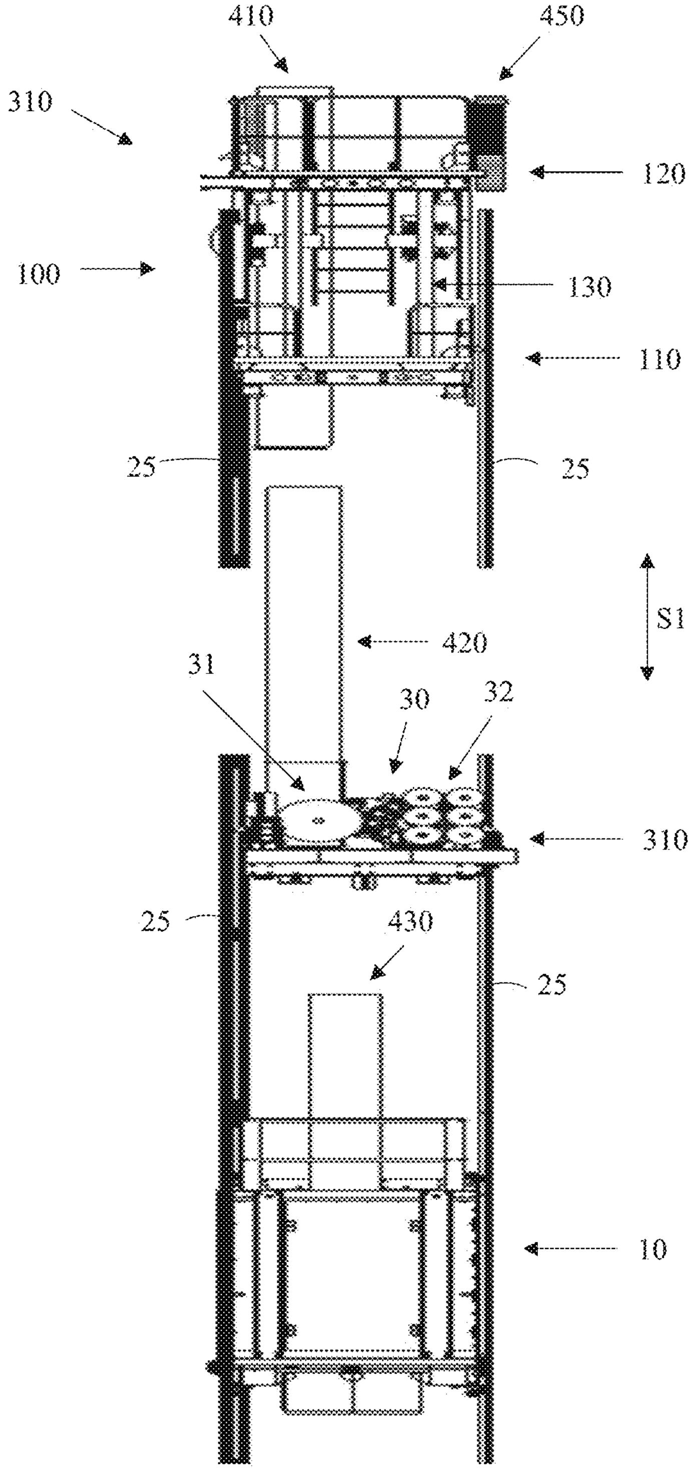
Figure 4:
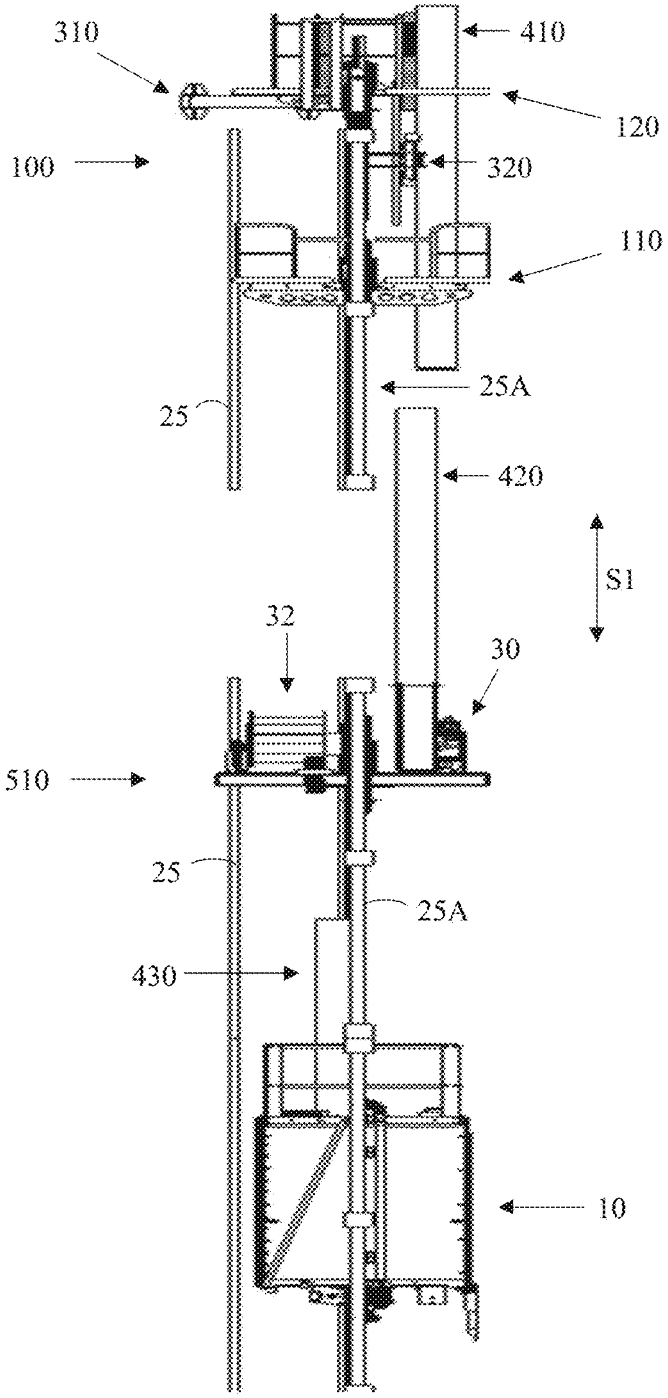
Figure 5:
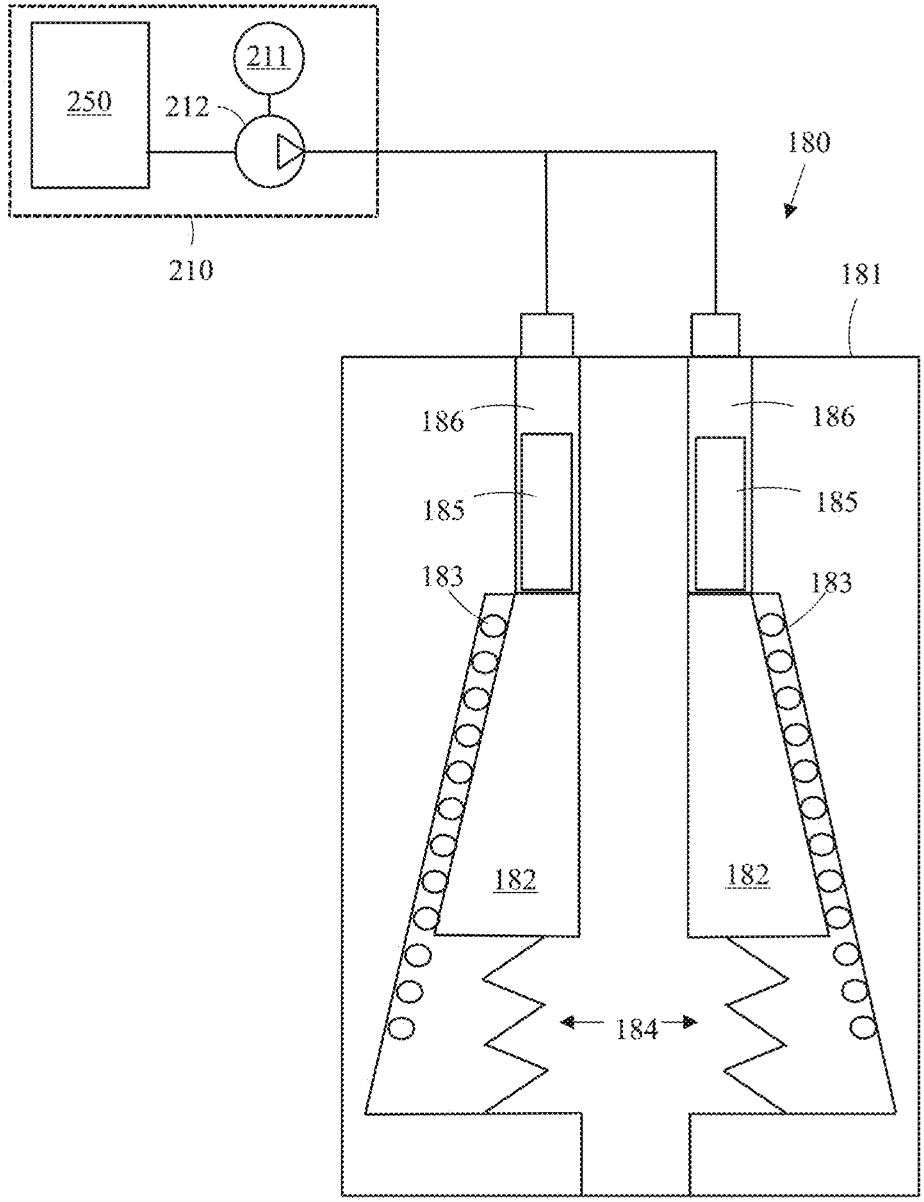
Figure 6:
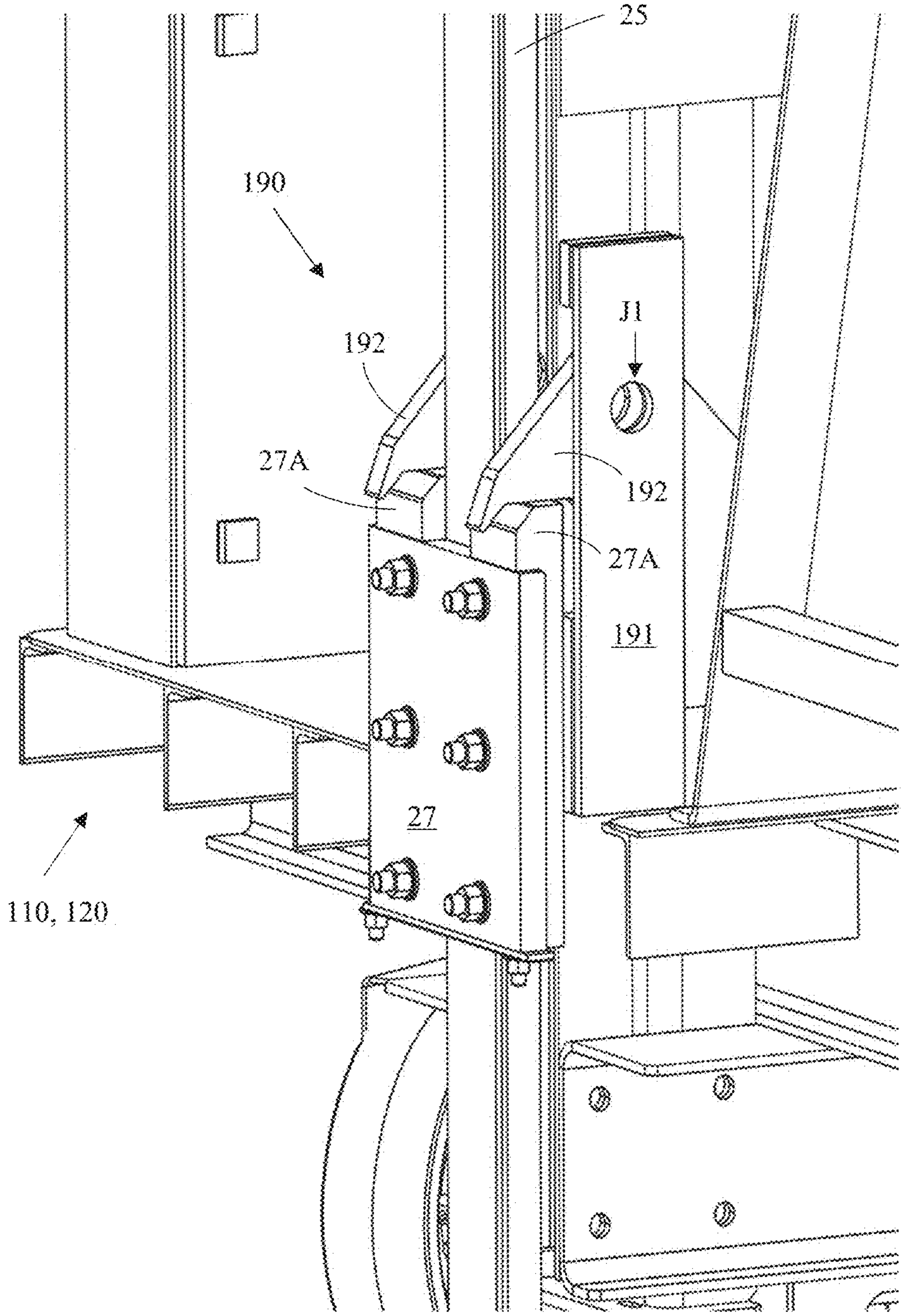
Figure 7:
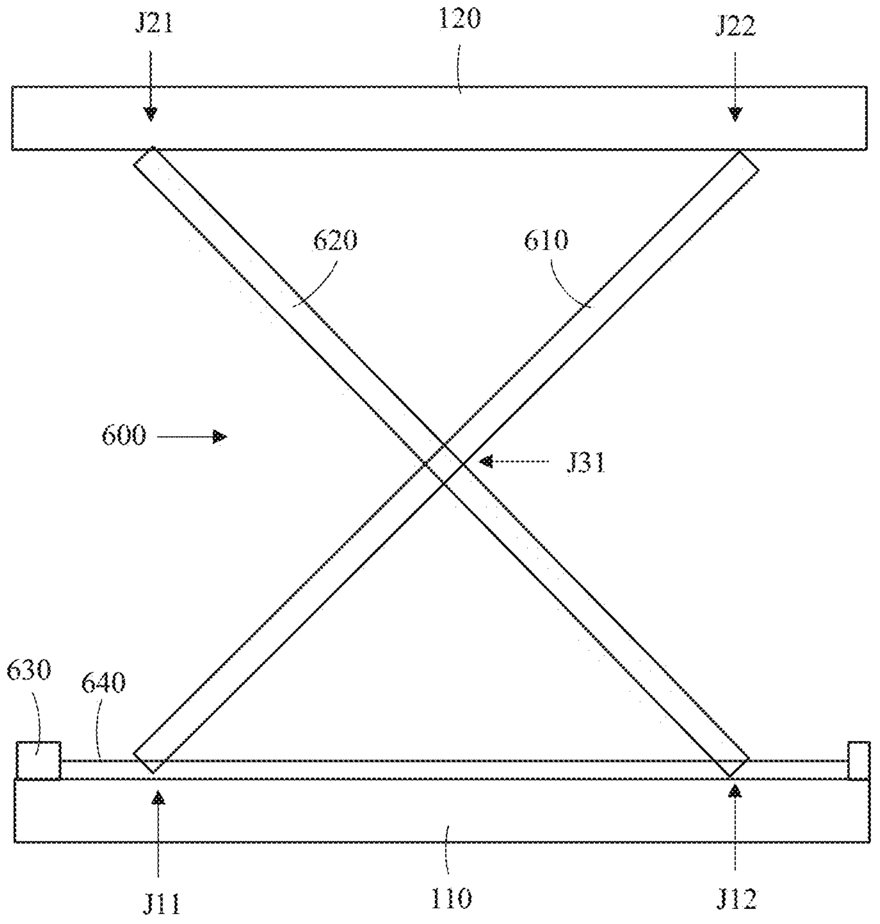
Figure 8:
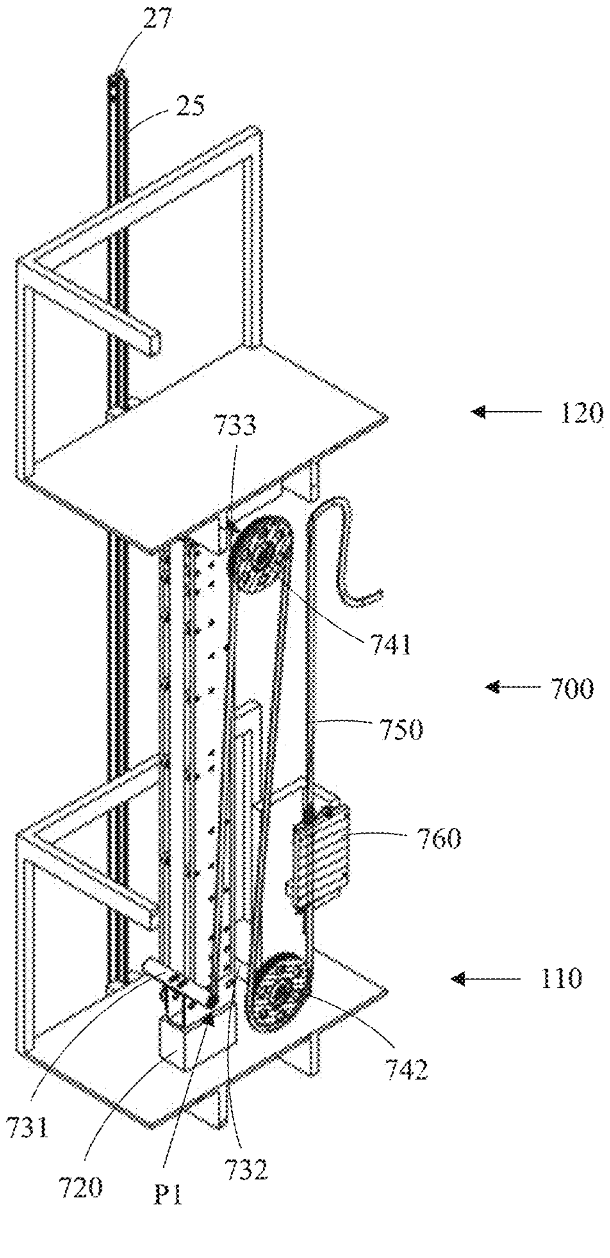
Figure 9:
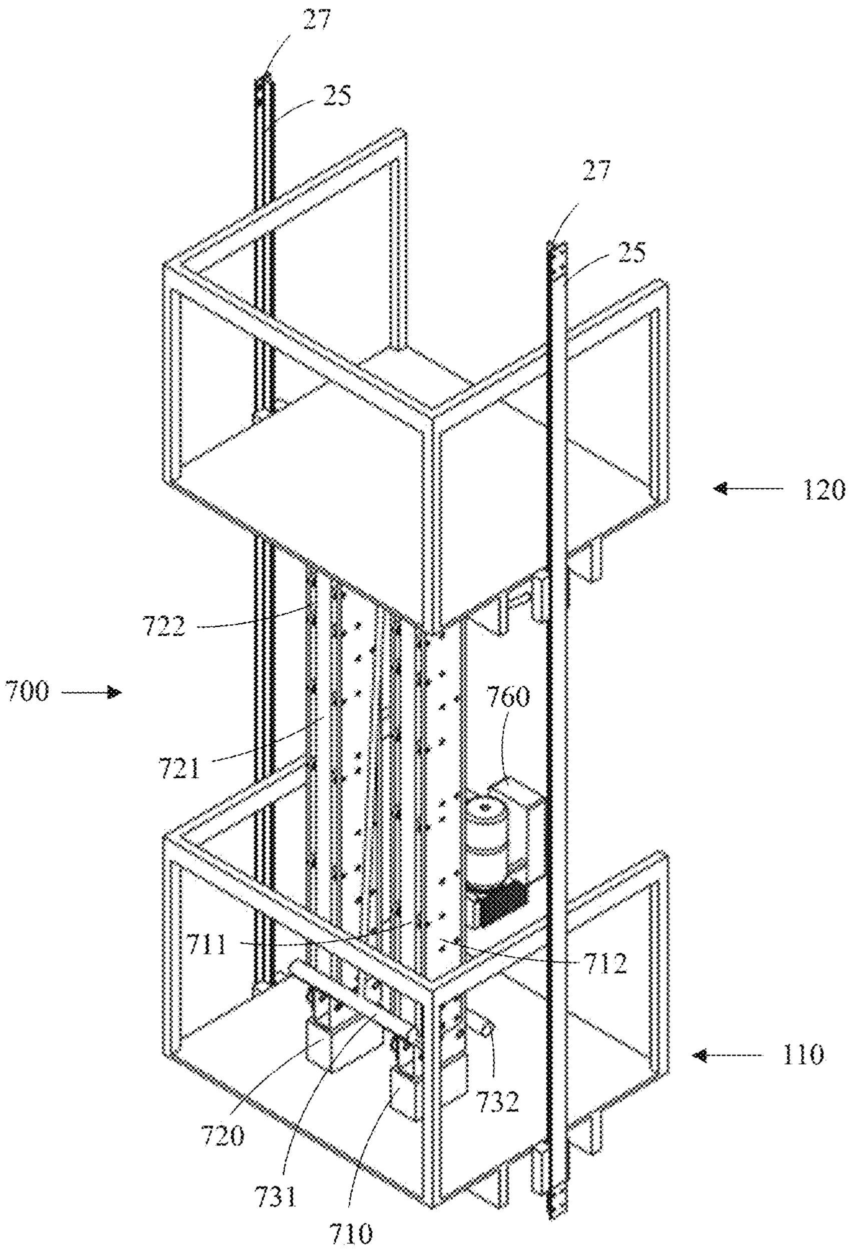
Figure 10:
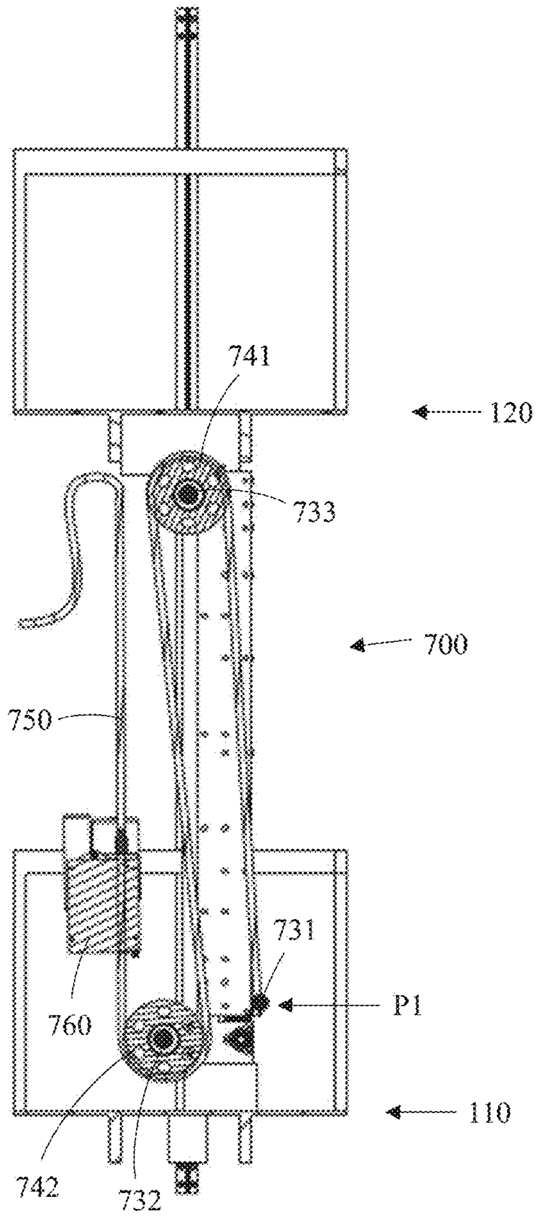
Figure 11:
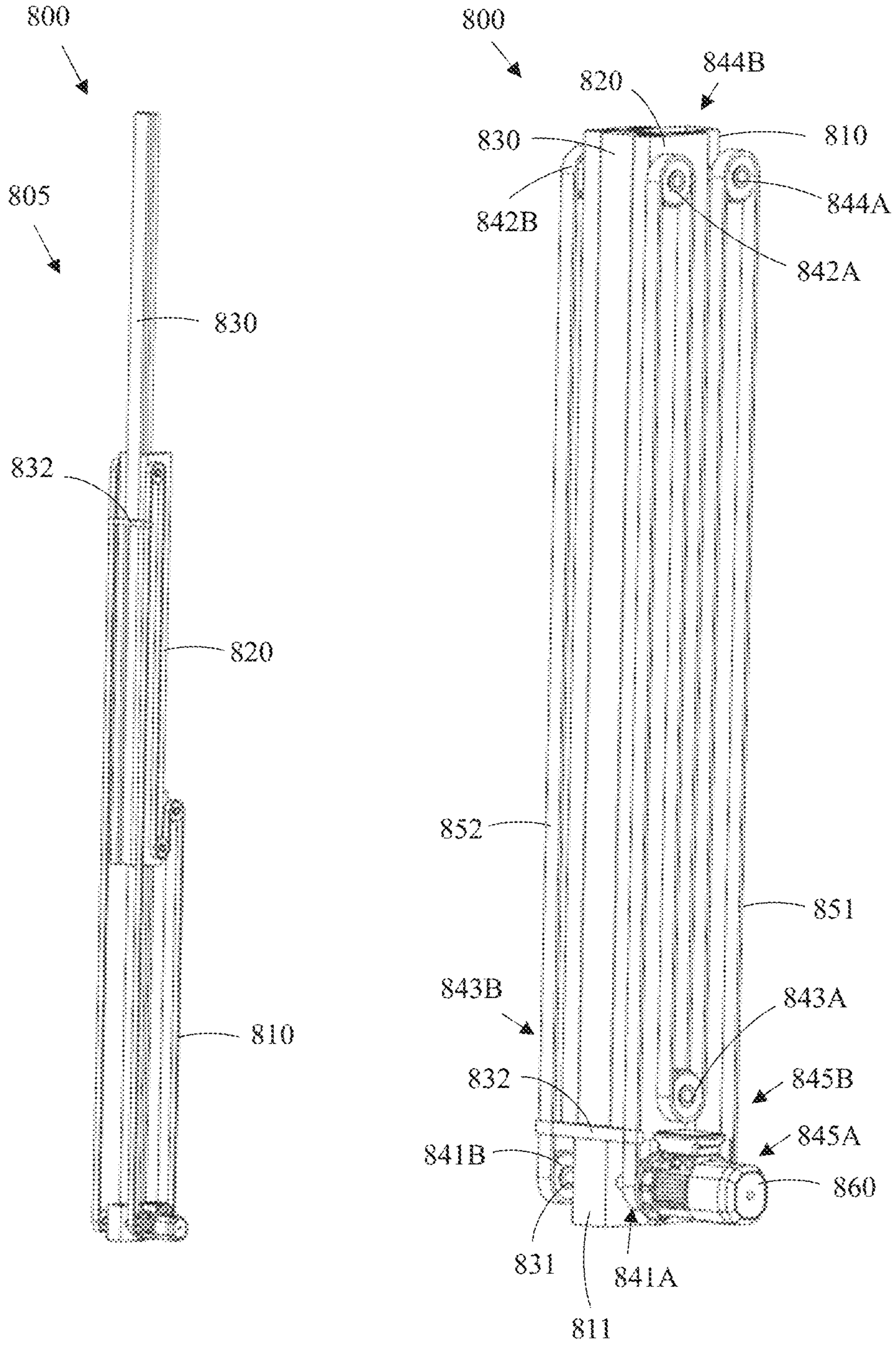
Figure 12:
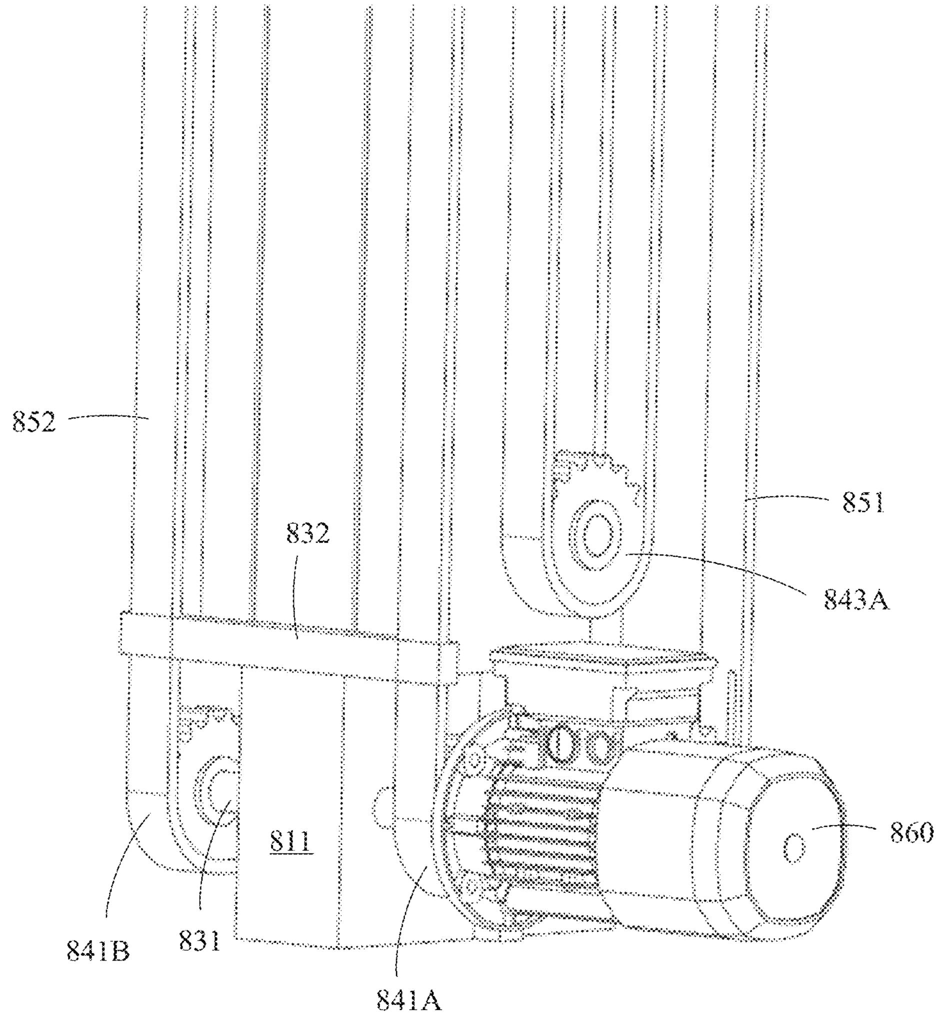
Figure 13:
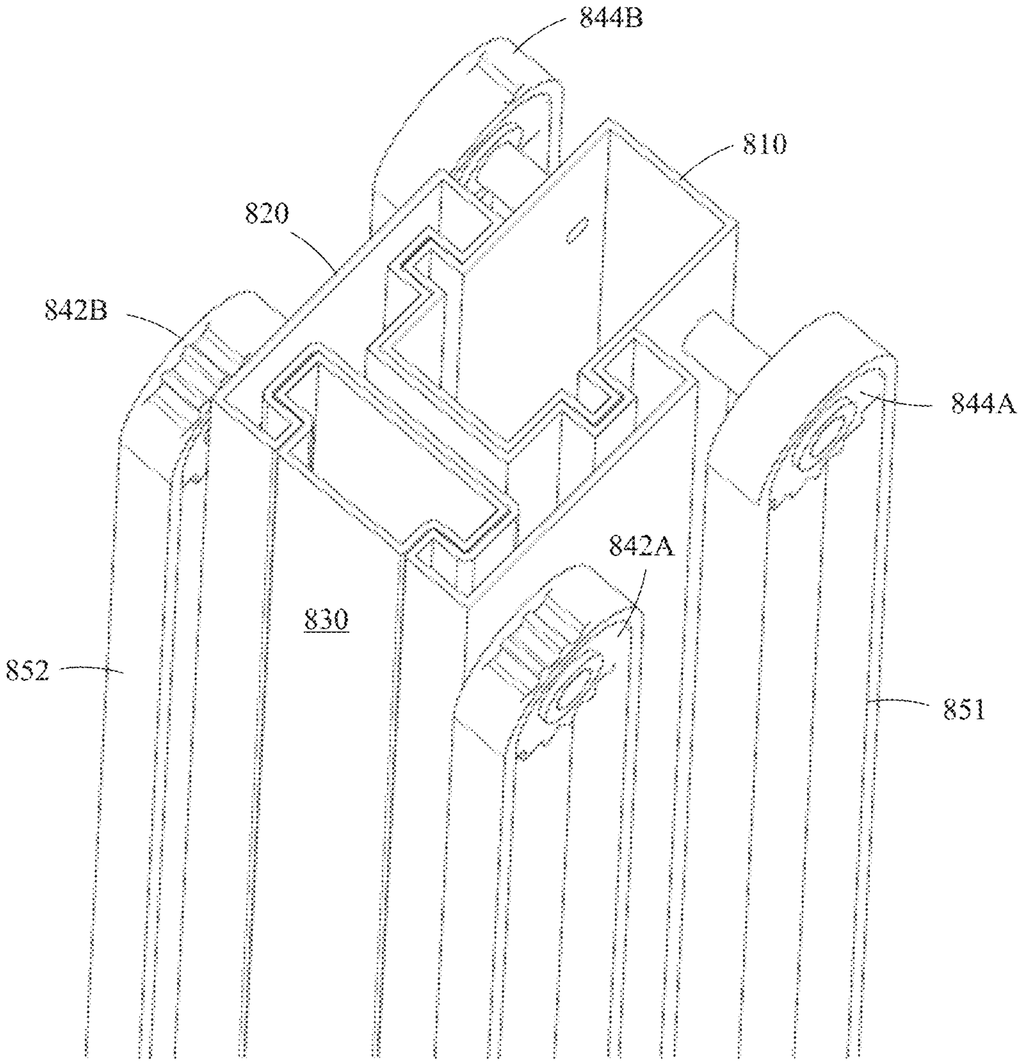

The invention will in the following be described in greater detail by means of preferred embodiments with reference to the attached drawings, in which:

FIG. 1 shows a cross-sectional view of a part of a self-climbing elevator arrangement, FIG. 2 shows an isometric view of a self-climbing elevator arrangement, FIG. 3 shows a back view of the self-climbing elevator arrangement of FIG. 2, FIG. 4 shows a side view of the self-climbing elevator arrangement of FIG. 2, FIG. 5 shows a view of first locking means, FIG. 6 shows a view of second locking means, FIG. 7 shows a side view of a second lifting means, FIG. 8 shows a first side view of a third lifting means, FIG. 9 shows a second side view of the third lifting means, FIG. 10 shows a third side view of the third lifting means, FIG. 11 shows a side view of a fourth lifting means, FIG. 12 shows an enlargement of a lower portion of the lifting means shown in FIG. 11, FIG. 13 shows an enlargement of an upper portion of the lifting means shown in FIG. 11.

DETAILED DESCRIPTION

FIG. 1 shows a cross-sectional view of a part of a self-climbing elevator arrangement.

The figure shows a self-climbing installation platform 100, which forms a part of the self-climbing elevator arrangement.

The self-climbing installation platform 100 is shown in a shaft 20 with guide rails 25 supported with brackets 26 on the walls 21 of the shaft 20. The guide rails 25 may be formed of guide rail elements. The opposite ends of two consecutive guide rail elements may be connected with guide rail fixing means. The guide rail fixing means may be formed of connecting elements, e.g. fish plates 27. The guide rail elements may have a certain length e.g. 5 meters. The guide rail elements may be attached with guide rail fixing means e.g. brackets 25 to the walls 21 in the shaft 20. There may be brackets 25 near both ends of the guide rail elements. The figure shows only a bottom portion of the shaft 20.

The self-climbing installation platform 100 may comprise two decks 110, 120. The two decks 110, 120 may be positioned upon each other in a vertical direction S1.

The lower deck 110 may be provided with upwards extending support means 140 and the upper deck 120 may be provided with downwards extending support means 150. The upwards extending support means 140 are firmly attached to the lower deck 110 and the downwards extending support means 150 are firmly attached to the upper deck 120. The support means 140, 150 extend around the guide rails 25. The support means 140, 150 may be provided with guide means 160 acting on the guide rails 25. There may be several guide means 160 along the height of the support means 140, 150. The use of several guide means 160 along the height of the support means 140, 150 will stabilize the deck 110, 120 horizontally on the guide rails 25. The outer ends of the support means 140, 150 are adjacent to each other when the vertical distance between the two decks 110, 120 is at a minimum L1 and move apart from each other when the vertical distance between the two decks 110, 120 is at a maximum L2. The support means 140, 150 may be formed of beams having a U-shaped cross-section.

The guide means 160 may be positioned within the support means 140, 150 and/or outside the support means 140, 150. Each deck 110, 120 is thus supported with guide means 160 on the guide rails 25 in the shaft 20. The guide means 160 support each deck 110, 120 on the guide rails 25 so that only movement in the vertical direction S1 along the guide rails 25 is possible.

The guide means 160 may be formed of a roller arrangement, whereby the rollers roll on the guide surfaces of the guide rails 25. The roller arrangement may correspond to a roller arrangement used in elevator cars for guiding the elevator car on the guide rails. The guide means 160 may on the other hand be formed of glide arrangement, whereby glide means glide on the guide surfaces of the guide rails 25. The glide arrangement may correspond to a glide arrangement used in elevator cars for guiding the elevator car on the guide rails.

Lifting means 130 may extend between the two decks 110, 120 in order to move the two decks 110, 120 along the guide rails 25 in relation to each other. The lifting means 130 may be formed of hydraulic actuators, e.g. telescopic cylinder means extending between the upper deck 120 and the lower deck 110. The two decks 110, 120 are thus movably supported in relation to each other with the hydraulic actuators. The hydraulic actuators provide only the lifting force between the two decks 110, 120. Each deck 110, 120 is kept horizontally in position by the guide means 160. The telescopic cylinder means 130 may comprise two telescopic cylinders 130. The hydraulic actuators may be positioned at opposite sides of the self-climbing elevator machine room 100.

Each deck 110, 120 may further be provided with locking means 170 on opposite vertical sides of the deck 110, 120. The locking means 170 may be attached to the deck 110, 120. The locking means 170 may act on the guide rails 25 and/or on the guide rail fixing means 26, 27. The locking means 170 may grip the guide rails 25 and/or the fish plates 27 and/or the brackets 26. The locking means 170 may lock the deck 110, 120 to the guide rails 25 in the shaft 20.

The self-climbing installation platform 100 may further comprise a power source 200. The power source 200 may provide power to the lifting means 130, e.g. a hydraulic actuator being arranged to operate the lifting means 130. The power source 200 may be formed of a hydraulic power unit. The hydraulic power unit may comprise an electric motor driving a hydraulic pump pumping fluid from a tank. The hydraulic power unit may supply pressurized fluid to the hydraulic actuators. Electric power to the electric motor may be supplied with cables from the electric power network of the construction site. Another possibility would be to arrange batteries on the self-climbing installation platform 100.

The self-climbing installation platform 100 may comprise two hydraulic power units 200. A first hydraulic power unit may be positioned on the lower deck 110 and a second hydraulic power unit may be positioned on the upper deck 120. The first hydraulic power unit and the second hydraulic power unit may be connected in parallel. Each of the two hydraulic power units may thus provide pressurized fluid to the hydraulic actuators in the lifting means 130.

The self-climbing installation platform 100 may further comprise a safety brake attached to each deck 110, 120. The safety brake may be formed of a continuously activated one-way brake. The safety brake allows upward movement of the deck 110, 120, but prevents downward movement of the deck 110, 120. Any commercial one-way safety brake may be used.

The self-climbing installation platform 100 may climb stepwise along the guide rails 25 by alternatingly locking and unlocking the lower deck 110 and the upper deck 120 to the guide rails 25 with the respective locking means 170 and thereafter raising the unlocked deck 110, 120 with the telescopic cylinder means 130.

The climbing procedure may start from a situation in which both decks 110, 120 are locked to the guide rails 25 with the locking means 170.

The first step in the climbing procedure comprises unlocking the upper deck 120. The second step comprises lifting the upper deck 120 upwards in the shaft along the guide rails 25. The third step comprises locking the upper deck 120 when the upper deck 120 has reached the desired destination above the lower deck 110. The fourth step comprises unlocking the lower deck 110. The fifth step comprises lifting the lower deck 110 upwards in the shaft 20 along the guide rails 25. The sixth step comprises locking the lower deck 110 when the lower deck 110 has reached a desired destination below the upper deck 120. The climbing procedure could then be repeated starting from the first step.

The vertical distance between the decks 110, 120 may vary between a minimum L1 and a maximum L2 during the climbing procedure. The vertical distance between the maximum and the minimum defines the maximum climbing step of the installation platform 100. The maximum climbing step may reach between two consecutive floors or between several consecutive floors in the shaft. The maximum climbing step depends on the lifting means 130.

The self-climbing installation platform 100 is in the figure shown in a situation in which the distance between the two decks 110, 120 is at a minimum L1. The upper position of the upper deck 120 is shown with broken lines, whereby the maximum distance L2 between the two decks 110, 120 is achieved.

The installation may be done from both decks 110, 120. The installation platform 100 could e.g. be parked in the shaft 20 so that the lower deck 110 is at a landing and the upper deck is above the landing. The landing doors could be installed from the lower deck 110 and the guide rails 25 could be installed from the upper deck 120.

FIG. 2 shows an isometric view of the self-climbing elevator arrangement, FIG. 3 shows a back view of the self-climbing elevator arrangement of FIG. 2, and FIG. 4 shows a side view of the self-climbing elevator arrangement of FIG. 2.

The self-climbing elevator arrangement 900 comprises a self-climbing installation platform 100, a machine room deck 510 positioned below the installation platform 100 and an elevator car 10 positioned below the machine room deck 310. The self-climbing installation platform 100, the machine room deck 510, and the elevator car 10 are all separately movably supported on the car guide rails 25 positioned on opposite side walls of the shaft. The figures show also the counterweight guide rails 25A positioned on a side wall of the shaft. The counterweight is not shown in the figures.

The installation platform 100 comprises two decks 110, 120 positioned vertically S1 above each other. The lifting means 130, the guide means 160 and the locking means 170 may be positioned on the decks 110, 120 in the same way as in FIG. 1. A safety brake may further be attached to each deck 110, 120. The safety brake may be formed of a continuously activated one-way brake. The safety brake allows upward movement of the deck 110, 120, but prevents downward movement of the deck 110, 120. Any commercial one-way safety brake may be used.

The self-climbing installation platform 100 may further comprise stabilizing means 310 for supporting the self-climbing installation platform 100 on the already installed guide rails 25. The stabilizing means 310 may grip the counterweight guide rails 25A in order to support the self-climbing installation platform 100 on the counterweight guide rails.

The self-climbing installation platform 100 may be provided with guide rail magazines 410 and bracket magazines 450. Guide rail elements and brackets may thus be stored on the installation platform 100 for a certain need. The guide rail magazines 410 and the bracket magazines 450 may be re-filled when the installation of guide rails progresses in the shaft. The installation platform 100 may be parked on the uppermost section of already installed guide rail elements when a new section of guide rail elements is to be installed.

The stabilizing means 310 may also be used to pick guide rails 25 from the guide rail magazines 410 and to position them on the wall in the shaft in order to attach the guide rails to the wall in the shaft.

The machine room deck 510 is positioned below the installation platform 100. The machine room deck 510 may comprise the elevator machinery 30 and other equipment needed in an elevator. The elevator machinery 30 may comprise a drive, a motor, a traction sheave, a machinery brake, and hoisting ropes. A cable drum 31 and hoisting rope drums 32 may further be positioned on the machine room deck 510. The cable drum 31 and the hoisting rope drums 32 are needed in order to provide lengthening of the car cable and the hoisting ropes as the machine room deck 510 climbs stepwise upwards in the shaft. The machine room deck 510 may be movably supported with guide means 160 on the guide rails 25. The machine room deck 510 may further be provided with locking means 170 in order to lock and unlock the machine room deck 510 to the guide rails 25 and/or to the guide rail fixing means 26, 27. The machine room deck 510 may also be provided with guide rail magazines 420. The machine room deck 510 may be used as an intermediate storage for guide rail elements.

The machine room deck 510 may be suspended from the installation platform 100. The suspension of the machine room deck 510 from the installation platform 100 may be arranged so that the machine room deck 510 is locked to the guide rails 25 and/or to the guide rail fixing means 26, 27 allowing the installation platform 100 to climb freely stepwise upwards in the shaft. Guide rail elements may be installed during the stepwise climbing of the installation platform. The installation platform 100 may then at some given height above the machine room deck 510 be locked to the guide rails 25 and/or to the guide rail fixing means 26, 27. The machine room deck 510 may then be lifted upwards e.g. with a rope lift positioned on the installation platform 100 to a position near the installation platform 100. The machine room deck 510 will then be locked to the guide rails 25 and/or to the guide rail fixing means 26, 27. The car cable and the hoisting cables may be extended so that the car 10 may be operated from this new higher position of the machine room deck 510.

The hydraulic power unit 200 may be divided into two hydraulic power units as disclosed in FIG. 1. A first hydraulic power unit may be positioned on the lower deck 110 and a second hydraulic power unit may be positioned on the upper deck 120. The first hydraulic power unit and the second hydraulic power unit may be connected in parallel. Each of the two hydraulic power units may thus provide pressurized fluid to the lifting means 130, which may be formed of two telescopic cylinders.

The elevator car 10 may be suspended with hoisting ropes passing from the elevator car 10 upwards to the traction sheave positioned on the machine room deck 510 and further downwards to the counterweight. The counterweight running on the counterweight guide rails 25A is not shown in the figures. The elevator car 10 may also be provided with guide rail magazines 430. The elevator car 10 may thus be used to transport guide rails 25 in the shaft. The elevator car 10 may be provided with an opening in the roof or with an openable roof in order to accommodate the guide rail magazines. The elevator car 10 may be movably supported with guide means 160 on the guide rails 25. The elevator car 10 may be provided with safety brakes e.g. electromechanically operated safety brakes may be used.

The self-climbing installation platform 100 may be used during the installation of the elevator in the shaft. The installation may be done manually and/or automatically from the decks 110, 120. Mechanics and/or robots may work on the decks 110, 120. The installation of the elevator may comprise installation of the guide rails as well as installation of the landing doors and all other equipment needed in the shaft.

The operation of the self-climbing elevator arrangement 900 may be as follows. The installation platform 100 may be used to climb stepwise upwards in the shaft during the installation of the guide rails and/or the lading doors and/or other equipment needed in an elevator in the shaft. The machine room deck 510 is locked to the guide rails 25 and/or to the guide rail fixing means 26, 27 in a position below the installation platform 100 when the installation platform 100 climbs upwards. The car 10 may be used to lift people and/or material to a height below the positioned machine room deck 510 in the shaft. When the installation platform 100 and thereby the installation has reached a predetermined height above the machine room deck 510, then the installation platform 100 may be locked to the guide rails 25 and/or to guide rail fixing means 26, 27. The machine room deck 510 may then be unlocked and lifted upwards e.g. with a rope hoist positioned on the installation platform 100. The car 10 may be locked to the guide rails 25 and/or to the guide rail fixing means 26, 27 during the lifting of the machine room deck 510. The car cable and the hoisting ropes may be extended during the lifting of the machine room deck 510. The machine room deck 510 may, after it has been lifted to a position near the installation platform 100, again be locked to the guide rails 25 and/or to guide rail fixing means 26, 27. The car 10 may now be operated from this second higher position of the machine room deck 510.

The capacity of the lifting means 130 on the installation platform 100 for lifting the installation platform 100 may be dimensioned to lift only one deck 110, 120 at a time stepwise upwards in the shaft. The capacity of the lifting means e.g. the rope hoist on the installation platform 100 for lifting the machine room deck 510 may be dimensioned to lift only the machine room deck 510 upwards in the shaft. The installation platform 100 may be lifted in small steps upwards in the shaft. The machine room deck 510 may on the other hand be lifted in long jumps upwards in the shaft.

The machine room deck 510 may comprise guide rail magazines 420. The machine room deck 510 may thus be used as an intermediate storage for guide rails. Guide rail elements may be lifted with the car 10 upwards to the machine room deck 510. The guide rail elements may be lifted through an opening in the roof of the car 10 and further through an opening in the machine room deck 510 upwards to the machine room deck 510. The guide rail elements may then be lifted upwards from the machine room deck 510 through an opening in the installation platform 100 up to the installation platform 100.

The machine room deck 510 may be locked to the guide rails 25 and/or to guide rail fixing means 26, 27 with locking means 170. The locking means 170 may be formed of brake means 180 or anchoring means 190. The machine room deck 510 could as an alternative or as a further option also be locked to interfaces provided in the shaft 20. The interfaces may be formed of pockets or support parts in the shaft. The machine room deck 510 my thus be provided with locking bars protruding outwards from the machine room deck 510. The locking bars will protrude into the pockets or onto the support parts, whereby the machine room deck 510 and thereby also the car 10 may be supported on the shaft instead of being supported on the guide rails 25. Locking of the machine room deck 510 to the shaft may be used e.g. in case the total weight being supported via the machine room deck 510 to the guide rails 25 becomes a problem. The weight may e.g. be a problem when the guide rail magazines 420 on the machine room deck 510 are full.

FIG. 5 shows a view of first locking means.

The first locking means 170 is formed of bake means 180. The brake means 180 may comprise a frame 181 with a slit for the guide rail 25 and two wedge shaped brake shoes 182 positioned on opposite sides of the guide rail 25. The brake shoes 182 may be movably supported from the wedge surface with rollers 183 on the frame 181. A spring 184 may be positioned between a first end of the brake shoe 182 and the frame 181. A second opposite end of the brake shoe 182 may be supported on a slide 185 acting in a cylinder 186.

A hydraulic power unit 210 may provide power to the brake means 180. The hydraulic unit 210 may comprise an electric motor 211, a hydraulic pump 212 and a reservoir 250. The hydraulic pump 212 pumps oil from the oil reservoir 250 to the cylinders 186 in order to move the slides 185 in the cylinders 186.

Supplying pressurized fluid to the plungers 185 in the cylinders 186 will press the brake shoes 182 downwards in the figure against the force of the springs 184. The brake shoes 182 are thus moved away from the guide surfaces of the guide rail 25. The deck 110, 120 is thus free to move on the guide rails 25.

Extracting pressurized fluid from the cylinders 186 will allow the brake shoes 182 to move upwards in the figure due to the force caused by the springs 184 acting on the second end of the brake shoe 182. The brake shoes 182 are thus moved into contact with the guide surfaces of the guide rail 25. The deck 110, 120 will thus become locked to the guide rails 25.

The hydraulic unit 210 may be provided only for the brake means 180. Another possibility is to have a common main hydraulic unit on the installation platform 100 for all equipment needing hydraulic power on the installation platform 100. Hydraulic valves may be used to connect the different equipment to the common main hydraulic power unit.

The brake means 180 may as an alternative be operated electromechanically. An electromechanical device may be used to press the brake shoes 182 against the force of the springs 184. Deactivation of the electromechanical device will activate the brake shoes 182 against the guide rails 25.

FIG. 6 shows a view of second locking means.

The second locking means 170 is formed of anchoring means 190. The anchoring means 190 may comprise a frame 191 supported on the deck 110, 120 and two claws 192 positioned on opposite sides of the guide rail 25. The claws 192 may be supported via a first articulated joint J1 on the frame 191. An actuator may be attached to the claws 192 on an opposite side of the first articulated joint J1 (not shown in the figure). The actuator may rotate the claws 192 around the first articulated joint J1 between a locked position in which the claws 192 are seated on an upper support surfaces 27A of the fish plates 27 and an unlocked position in which the claws are rotated in a clockwise direction and thereby removed from contact with the fish plate 27.

The actuator may be formed of a hydraulic cylinder or of an electromechanical device. The claws 192 could be operated by an electric motor or by one or more electromechanical devices.

The deck 110, 120 becomes supported on the fish plate 27 in the locked position of the anchoring means 190. The support on the fish plate 27 eliminates downward movement of the deck 110, 120. The deck 110, 120 is free to move on the guide rails 25 in the unlocked position of the anchoring means 190.

The fish plates 27 are normally positioned in the joint between two consecutive guide rail elements. Additional fish plates 27 could be positioned along the length of the guide rail elements. The guide rail element could be provided with intermediate fish plates 27 attached to the guide rail elements already before the installation of the guide rail elements. A fish plate 27 could e.g. be positioned in the middle of a 5 m long guide rail element. The intermediate fish plates 27 could be left on the guide rails permanently after the installation. Another possibility would be to remove the intermediate fish plates as the installation proceeds upwards.

The fish plate 27 may be wider than the guide rail 25 so that the upper surface of the fish plate 27 forms an upper support surface 27A for the claw 192 on each side of the guide rail 25. The construction of the fish plates 27 may thus be adapted to work as support points for the claws 192 in the anchoring means 190.

The fish plate 27 is an example of a connection element that may be used to connect the ends of consecutive guide rail elements.

A similar anchoring means 190 could be used to lock the deck 110, 120 to the brackets 26 attaching the guide rails 25 to the walls 21 in the shaft 20. The claws 192 could then interact with brackets 26.

FIG. 7 shows a side view of a second lifting means.

The second lifting means could be formed as an articulated jack 600. A middle portion of two support arms 610, 620 could be connected via an articulated joint J31. The upper end of each support arm 610, 620 may be supported via articulated joint J21, J22 on the upper deck 120. The lower end of each support arm 610, 620 may be supported via an articulated joint J11, J12 on the lower deck 110. Each of the articulated joints J11, J12 at the lower deck 110 and each of the articulated joints J21, J22 at the upper deck 120 should be arranged so that movement of the ends of the support arms 610, 620 in the horizontal direction is allowed, but movement in the vertical direction is prevented.

An actuator 630 may be provided on the lower deck 110. The actuator may be connected to a rod 640 passing in a horizontal direction along the lower deck 110. The rod 640 may be formed as a worm.

The lower end of the first support arm 610 could be attached via a shaft 640 to an actuator 630. The lower end of the first support arm 610 may be provided with articulated joint cooperating with the worm screw 640. The worm screw 640 may be attached via joint parts to the lower end portions of the support arms 610, 620. The outer ends of the worm screw 640 may be supported on the lower deck 110.

Rotation of the actuator 630 in a first direction will move the lower ends of the support arms 610, 620 towards each other, whereby the lower deck 110 and the upper deck 120 is moved in a direction away from each other. Rotation of the actuator 630 in a second opposite direction will move the lower ends of the support arms 610, 620 away from each other, whereby the lower deck 110 and the upper deck 120 is moved in a direction towards each other. The lower deck 110 and the upper deck 120 may thus be lifted alternatingly upwards with the actuator 630.

The lower deck 110 may be locked to the guide rails, whereby the unlocked upper deck 120 may be lifted by rotating the actuator 630 in the first direction. The upper deck 120 may thereafter be locked to the guide rails, whereby the lower deck 110 may be lifted by rotating the actuator 630 in the second direction.

The actuator 630 may be formed of a motor, e.g. an electric motor rotating the worm screw 640. A pair of articulated jacks 600 may be used i.e. one articulated jack 600 may be positioned at each side edge of the decks 110, 120.

The articulated jack 600 could as an alternative be operated by a hydraulic cylinder-piston apparatus. The cylinder-piston apparatus could extend between the lower deck 110 and an upper portion of either support arm 610, 620. The articulated jack 600 could also comprise several layers of crosswise running support arms stacked upon each other.

FIG. 8 shows a first side view of a third lifting means, FIG. 9 shows a second side view of the third lifting means, and FIG. 10 shows a third side view of the third lifting means.

The third lifting means 700 could be realized with ropes and pulleys. Two parallel support structures 710, 720 may extend between the lower deck 110 and the upper deck 120. The two support structures 710, 720 may be positioned at a horizontal distance from each other. Each of the support structures 710, 720 may comprise an inner support bar 711, 721 and an outer support bar 712, 722. The inner support bar 711, 721 is positioned inside the outer support bar 712, 722. The inner support bar 711, 721 may be locked to the outer support bar 712, 722 with a form lock so that the inner support bar 711, 721 may move in the longitudinal direction in relation to the outer support bar 712, 722. The lower end of the outer support bar 712, 722 may be attached to the lower deck 110 and the upper end of the inner support bar 711, 721 may be attached to the upper deck 120.

A first shaft 731 may extend in a horizontal direction between the lower end portions of the inner support bars 711, 721. Each end of the first shaft 731 may be attached to a lower end of a respective inner support bar 711, 721. A second shaft 732 may extend in a horizontal direction between the lower end portions of the outer support bars 712, 722. Each end of the second shaft 732 may be attached to a lower end of a respective outer support bar 712, 722. The first shaft 731 and the second shaft 732 may be positioned on opposite sides of the two support structures 710, 720. A third shaft 733 may extend between the upper end portions of the outer support bars 712, 722. Each end of the third shaft 733 may be attached to an upper end of a respective outer support bar 712, 722.

A first pulley 741 may be positioned between the two support structures 710, 720. The first pulley 741 may be rotatably supported on the third shaft 733. The first pulley 741 is thus stationary in relation to the outer support bars 712, 722. A second pulley 742 may be positioned between the two support structures 710, 720. The second pulley 742 may be rotatably supported on the second shaft 732. The second pulley 742 is thus stationary in relation the outer support bars 712, 722.

A first end of a rope 750 may be fixed in a first fixing point P1 to the first shaft 731. The rope 750 may pass from the first fixing point P1 upwards to the first pulley 741. The rope 750 may then turn around the first pulley 741 and pass downwards to the second pulley 742. The rope 750 may then turn around the second pulley 742 and pass upwards through a lifting apparatus 760 supported on the lower deck 110. A second end of the rope 750 may be free.

The lifting apparatus 760 may be a man riding hoist. The lifting apparatus 760 may comprise traction rolls positioned on opposite sides of the rope 750. The traction rolls may be driven by one or more motors, e.g. electric motors. Rotation of the traction rolls in a first direction will pull the rope 750 upwards through the lifting apparatus 760. Rotation of the traction rolls in a second opposite direction will move the rope 710 in a second opposite direction downwards through the lifting apparatus 760. The traction rolls will thus control the movement of the rope 750 through the lifting apparatus 760.

The decks 110, 120 are shown in a position in which the vertical distance between the lower deck 110 and the upper deck 120 is at a minimum.

The lower deck 110 may first be locked to the guide rails, whereby the upper deck 120 is unlocked. The lifting apparatus 730 may now start to pull the rope 710 in the first direction upwards through the lifting apparatus 760. The first end of the rope 750 is attached to the first shaft 731, which is attached to the lower ends of the inner support bars 711, 721. The inner support bars 711, 721 will thus start to move upwards, whereby also the upper deck 120 starts to move upwards in relation to the stationary lower deck 110. The vertical distance between the lower deck 110 and the upper deck 120 will be at a maximum when the first shaft 731 is at a distance below the first pulley 741. The first shaft 731 may be raised to a position below the outer circumference of the first pulley 741. There should be overlapping between the inner support bars 711, 721 and the outer support bars 712, 722 also in the position in which the distance between the decks 110, 120 is at a maximum.

The upper deck 120 may then be locked to the guide rails, whereby the lower deck 110 is unlocked. The lifting apparatus may now start to pull the rope 750 in a second opposite direction downwards through the lifting apparatus 760. The lower deck 110 will start to move upwards, whereby the outer support bars 712, 722 move upwards along the inner support bars 711, 721. The lower deck 110 moves upwards until the first support point P1 is again in the position near the lower deck 110. We thus end up in the situation shown in the figure where the vertical distance between the decks 110, 120 is at a minimum.

The shafts 731, 732, 733 may be stationary and the pulleys 741, 742 may be rotatably attached to the shafts 732, 733.

FIG. 11 shows a side view of a fourth lifting means, FIG. 12 shows an enlargement of a lower portion of the lifting means shown in FIG. 11 and FIG. 13 shows an enlargement of an upper portion of the lifting means shown in FIG. 11.

The lifting means 800 is on the left hand side of FIG. 11 shown in an expanded state and on the right hand side of FIG. 11 in a contracted state.

The lifting means 800 is formed of a support structure 805 comprising three support bars 810, 820, 830 that are movably supported on each other. The third support bar 830 may be supported with a first form locking within the second support bar 820. The second support bar 820 may be supported with a second form locking within the first support bar 810. The third support bar 830 may move in the longitudinal direction in relation to the second support bar 820. The second support bar 820 may move in the longitudinal direction in relation to the first support bar 810. The form locking of the support bars 810, 820, 830 is shown in FIG. 13.

The movement of the support bars 810, 820, 830 in relation to each other is done with cogged belts or chains 851, 852 and cogwheels 841A, 841B, 842A, 842B, 843A, 843B, 844A, 844B, 845A, 845B. The cogged belts or chains 851, 852 may be driven by an actuator 860. The actuator 860 may be a motor, e.g. an electric motor.

A first cogged belt or chain 851 may be positioned on a first side of the support structure 805 and a second cogged belt or chain 852 may be positioned on a second opposite side of the support structure 805.

The first cogged belt or chain 851 may pass in a closed loop over cogwheels 841A, 842A, 843A, 844A and 845A on a first side of the support structure 805. The second cogged belt or chain 852 may pass in a closed loop over cogwheels 841B, 842B, 843B, 844B and 845B on a second side of the support structure 805. The cogwheels on opposite sides of the support structure 805 may be arranged in pairs. The cogwheels in each pair of cogwheels being positioned opposite each other so that the centre axis of the shafts of the cogwheels coincide. Each cogwheel may be rotatably supported on a shaft, whereby the shaft is stationary and attached to the support structure 805. The other possibility is that each cogwheel is fixed to the shaft and the shaft is rotatably attached to the support structure 805.

The first cogwheel 841A on the first side of the support structure 805 and the first cogwheel 841B on the second opposite side of the support structure 805 may be connected to each other with a first shaft 831. The first shaft 831 may further be connected to an actuator 860. The actuator 860 may be a motor, e.g. an electric motor. The motor 860 may drive the two cogged belts or chains 851, 852 in synchronism. The first shaft 831 may pass through a lower end portion 811 of the first support bar 810. The first shaft 831 may be rotatably supported on the lower end portion 811 of the first support bar 810. Said lower end portion 811 of the first support bar 810 may be attached to the lower deck 110. The upper end of the third support bar 830 may be attached to the upper deck 120.

The first pair of cogwheels 841A, 841B are thus stationary in relation to the first support bar 810. The second pair of cogwheels 842A, 842B are supported on the upper end of the second support bar 820. The third pair of cogwheels 843A, 843B are supported on the lower end of the second support bar 820. The fourth pair of cogwheels 844A, 844B are supported on the upper end of the first support bar 810. The fifth pair of cogwheels 845A, 845B are supported on the lower end 811 of the first support bar 810. The fifth pair of cogwheels 845A, 845B are thus stationary. A lower end of the third support bar 830 is further attached via a second shaft 832 to both cogged belts or chains 851, 852.

When the motor 860 is rotated in a first clockwise direction, then the second support bar 820 and the third support bar 830 will move upwards as shown on the left hand in FIG. 11.

When the motor 860 is rotated in a second, counter clockwise direction, then the second support bar 820 and the third support bar 830 will move downwards and return to the position shown on the right hand in FIG. 11.

This third lifting means 800 may be modified so that two parallel support structures 805 positioned at a distance from each other e.g. at opposite edges of the decks 110, 120 are used. Each support structure 805 may comprise three support bars 810, 820, 830. The two support structures 805 could be connected to each other with shafts or profiles. Corresponding cogwheels 841A, 842A, 843A, 844A, 845A could be provided on a middle portion of the shafts or profiles. The drive could then be realized with one cogged belt or chain.

The lifting means 130 could as a further alternative be realized with a screw mechanism operated by an actuator. The actuator could be a motor, e.g. an electric motor. Gear racks, pinions and worm screws could be used in the screw mechanism.

The figures show a first locking means 170 in the form of a brake means 180 and a second locking means 170 in the form of an anchoring means 190. The brake means 180 and/or the anchoring means 190 may be used as locking means in the decks 110, 120 of the installation platform 100 and/or in the machine room deck 510 and/or in the elevator car 10.

The decks 110, 120 may in each embodiment of the invention comprise guide means 160 for supporting the deck 110, 120 movably on the guide rails 25 and locking means 170 for locking and unlocking the deck 110, 120 to the guide rails 25 and/or to guide rail fixing means 26, 27.

The at least one power source 200 may be formed of a hydraulic power unit comprising an electric motor, a hydraulic pump and a tank. The at least one power source 200 may on the other hand be formed of one or more motors providing power via a rotating shaft, e.g. a hydraulic motor or an electric motor. The one or more motors may provide power to the lifting apparatus 130.

The use of the invention is not limited to any specific elevator type. The invention can be used in connection with any type of elevator e.g. also in elevators lacking a machine room and/or a counterweight. The counterweight could be positioned on the back wall of the shaft or on either side wall of the shaft or on both side walls of the shaft.

It will be obvious to a person skilled in the art that, as the technology advances, the inventive concept can be implemented in various ways. The invention and its embodiments are not limited to the examples described above but may vary within the scope of the claims.

The invention claimed is:

1. A self-climbing elevator arrangement for use during construction of a building, the self-climbing elevator arrangement comprising:

a self-climbing installation platform including, two decks including an upper deck and a lower deck, the lower deck being below the upper deck, and each respective deck among the two decks including, a first guide for supporting the respective deck movably on guide rails, and a first lock for locking and unlocking the respective deck to the guide rails or to a guide rail fixer, a lift for moving the two decks along the guide rails in relation to each other, and at least one power source configured to provide power to the lift, the self-climbing installation platform being configured to climb stepwise along the guide rails by alternatingly performing, a first operation including locking the first lock of the lower deck while lifting the upper deck with the lift, and a second operation including locking the first lock of the upper deck while lifting the lower deck with the lift;

a machine room deck below the self-climbing installation platform, the machine room deck being suspended from the self-climbing installation platform, and the machine room deck including, a second guide for supporting the machine room deck movably on the guide rails, and a second lock for locking and unlocking the machine room deck to the guide rails or to the guide rail fixer; and an elevator car positioned below the machine room deck, the elevator car being suspended with hoisting ropes from a traction sheave on the machine room deck, and the elevator car including, a third guide for supporting the elevator car movably on the guide rails, and a third lock for locking the elevator car to the guide rails or to the guide rail fixer.

2. The self-climbing elevator arrangement according to claim 1, wherein the lift configured to be operated by a hydraulic actuator.

3. The self-climbing elevator arrangement according to claim 2, wherein the at least one power source comprises a hydraulic power unit comprising an electric motor, a hydraulic pump and a tank.

4. The self-climbing elevator arrangement according to claim 3, wherein the hydraulic power unit is a first hydraulic power unit, the electric motor is a first electric motor, the hydraulic pump is a first hydraulic pump, and the tank is a first tank:

the at least one power source comprises the first hydraulic power unit and a second hydraulic power unit, the second hydraulic power unit including a second electric motor, a second hydraulic pump and a second tank;

the first hydraulic power unit is on the lower decki and the second hydraulic power unit is on the upper deck.

5. The self-climbing elevator arrangement according to claim 4, wherein the first hydraulic power unit and the second hydraulic power unit are connected in parallel.

6. The self-climbing elevator arrangement according to claim 1, wherein the lift comprises at least one double acting telescopic cylinder extending between the upper deck and the lower deck.

7. The self-climbing elevator arrangement according to claim 1, wherein the lift comprises at least one articulated jack extending between the upper deck and the lower deck.

8. The self-climbing elevator arrangement according to claim 1, wherein the lift comprises at least one support structure extending between the upper deck and the lower deck, each of the at least one support structure including at least two support bars movably supported on each other, the at least two support bars including a first support bar and a second support bar, an upper end of the first support bar being attached to the upper deck, a lower end of the second support bar being attached to the lower deck, a rope, cogged belt or chain being arranged to run over pulleys or cogwheels attached to the at least two support bars, the rope, cogged wheel or chain being driven by an actuator to move the at least two support bars in relation to each other in a first direction, and the movement of the at least two support bars causing the upper deck and the lower deck to move along the guide rails in relation to each other.

9. The self-climbing elevator arrangement according to claim 8, wherein the first support bar is an inner support bar and the second support bar is an outer support bar, the inner support bar being movable in the first direction within the outer support bar, the inner support bar being movable with a rope, the rope having a first end attached to a lower end of the inner support bar, the rope passing over a first pulley attached to an upper end of the outer support bar, the rope passing over a second pulley attached to a lower end of the outer support bar, the rope passing through a lifting apparatus supported on the lower deck, the lifting apparatus including traction rolls for moving the rope in opposite directions in a controlled manner to move the inner support bars and the outer support bars in the first direction in relation to each other.

10. The self-climbing elevator arrangement according to claim 8, wherein each respective support structure among the at least one support structure comprises the first support bar, the second support bar and a third support bar, the third support bar being movable in the first direction within the second support bar, the first support bar being movable in the first direction within the third support bar, a first cogged belt or chain being on a first side of the respective support structure, and a second cogged belt or chain being on a second side of the respective support structure, the second side of the respective support structure being opposite of the first side of the respective support structure, each of the first cogged belt or chain and the second cogged belt or chain passing in a closed loop over a respective first cogwheel attached to a lower end of the second support bar, over a respective second cogwheel attached to an upper end of the third support bar, over a respective third cogwheel attached to a lower end of the third support bar, over a respective fourth cogwheel attached to an upper end of the second support bar, over a respective fifth cogwheel attached to a lower end of the second support bar and back to the respective first cogwheel, the respective first cogwheel being driven by a motor to move the first support bar, the second support bar and the third support bar in the first direction in relation to each other.

11. The self-climbing elevator arrangement according to claim 1, wherein the first guide comprises a roller supported on the respective deck, the roller being configured to roll on guide surfaces of the guide rails.

12. The self-climbing elevator arrangement according to claim 1, wherein the first guide comprises a glider supported on the respective deck, the glider being configured to glide on guide surfaces of the guide rails.

13. The self-climbing elevator arrangement according to claim 1, wherein the guide rail fixer comprises connecting elements connecting ends of consecutive guide rail elements together.

14. The self-climbing elevator arrangement according to claim 1, wherein the guide rail fixer comprises brackets attaching the guide rails to walls of a shaft.

15. The self-climbing elevator arrangement according to claim 1, wherein the machine room deck comprises guide rail magazines.

16. The self-climbing elevator arrangement according to claim 1, wherein the first lock comprises a brake having brake pads, the brake pads being configured to:

act on opposite guide surfaces of the guide rails for locking the respective deck to the guide rails, and release from the opposite guide surfaces of the guide rails for unlocking the respective deck from the guide rails.

17. The self-climbing elevator arrangement according to claim 16, wherein the first lock comprises the brake and an anchor.

18. The self-climbing elevator arrangement according to claim 1, wherein the first lock comprises an anchor having two claws positioned on opposite sides of the guide rails, and the anchor being configured to act on support surfaces of fish plates attached to the guide rails to anchor the respective deck to the fish plates.

19. The self-climbing elevator arrangement according to claim 1, wherein the first operation includes unlocking the first lock of the upper deck and supporting the upper deck using the lower deck; and the second operation includes unlocking the first lock of the lower deck and supporting the lower deck using the upper deck.

20. A method for using a self-climbing elevator arrangement during construction of a building, the self-climbing elevator arrangement including, a self-climbing installation platform including, two decks including an upper deck and a lower deck, the lower deck being below the upper deck, and each respective deck among the two decks including, a first guide for supporting the respective deck movably on guide rails, and a first lock for locking and unlocking the respective deck to the guide rails or to a guide rail fixer, a lift for moving the two decks along the guide rails in relation to each other, and at least one power source configured to provide power to the lift, a machine room deck below the self-climbing installation platform, the machine room deck being suspended from the self-climbing installation platform, and the machine room deck including, a second guide for supporting the machine room deck movably on the guide rails, and a second lock locking means for locking and unlocking the machine room deck to the guide rails or to the guide rail fixer fixing, and an elevator car below the machine room deck, the elevator car being suspended with hoisting ropes from a traction sheave on the machine room deck, and the elevator car including, a third guide for supporting the elevator car movably on the guide rails, and a third lock for locking the elevator car to the guide rails and/or or to the guide rail fixer, and the method comprising:

climbing, with the self-climbing installation platform, stepwise along the guide rails by alternatingly performing, a first operation including locking the first lock of the lower deck while lifting and the upper deck with the lift, and a second operation including locking the first lock of the upper deck while lifting the lower deck with the lift.

* * * * *